M. WARNER.
FENDER.
APPLICATION FILED MAY 1, 1914.
1,157,198.
Patented Oct. 19, 1915.
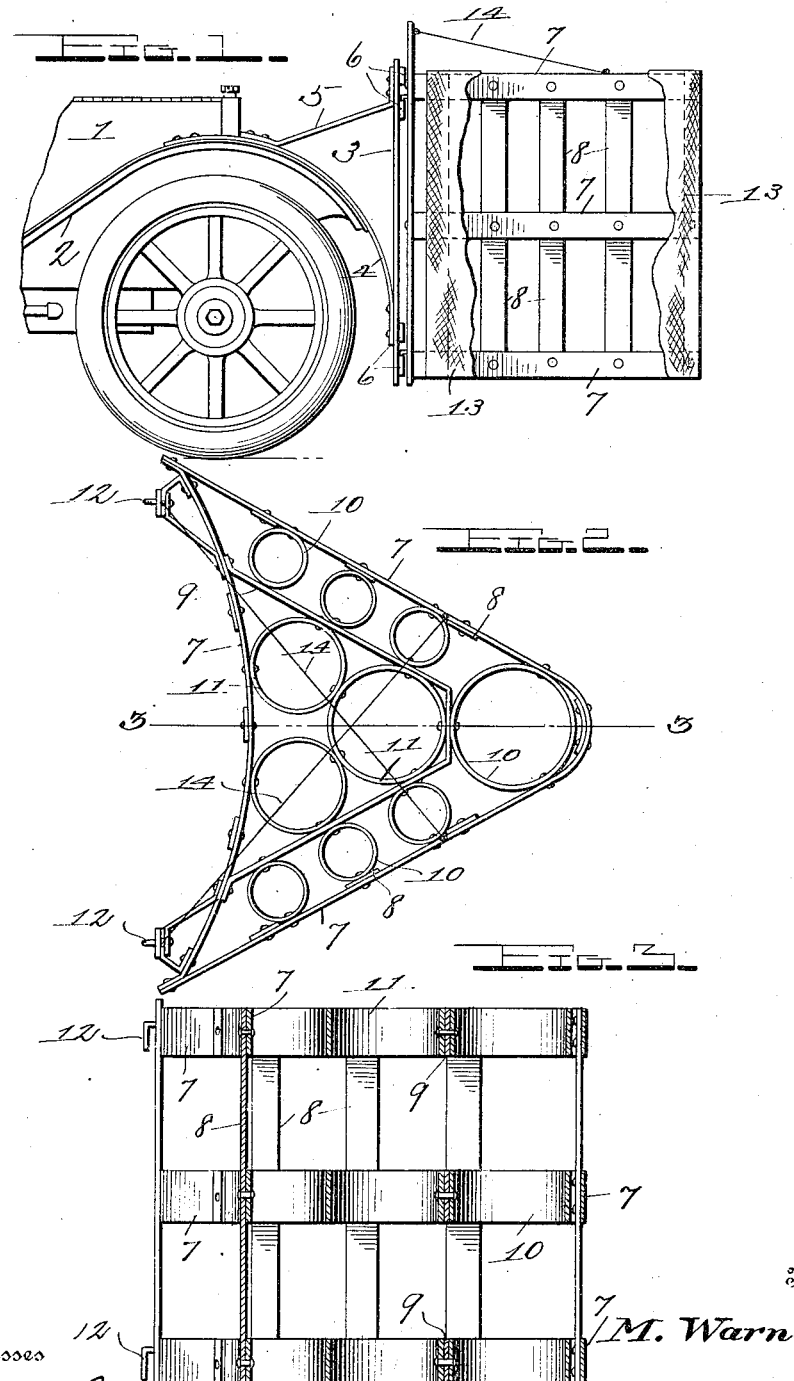

UNITED STATES PATENT OFFICE.

MAHLON WARNER, OF MILLVILLE, NEW JERSEY, ASSIGNOR OF ONE-HALF TO ZEB GASKILL, OF MILLVILLE, NEW JERSEY.

FENDER.

1,157,198.　　Specification of Letters Patent.　　Patented Oct. 19, 1915.

Application filed May 1, 1914. Serial No. 835,723.

*To all whom it may concern:*

Be it known that I, MAHLON WARNER, a citizen of the United States, residing at Millville, in the county of Cumberland and State of New Jersey, have invented a new and useful Improvement in Fenders, of which the following is a specification.

This invention relates to a spring fender adapted especially to be applied to automobiles but capable of application to various forms of vehicles including street cars.

The object of the invention is to prevent injury to a person struck by the vehicle, the device being so arranged as to push the party being struck to one side whereas the common type of fender usually throws the party upon the fender itself.

The invention consists of the novel features of construction hereinafter described, pointed out in the claims and shown in the accompanying drawings, in which:

Figure 1 is a side elevation showing the device applied to an automobile, parts of the covering being removed. Fig. 2 is a plan view. Fig. 3 is a section on the line 3—3 of Fig. 2.

In these drawings, 1 represents the forward portion of an automobile having a wheel guard 2. Supported from the wheel guard is an upright 3, said upright having secured to its rear face a curved member 4 which fits over the guard, and a brace member 5. Upon its front face the upright member 3 is provided with a plurality of hook receiving sockets 6, preferably arranged in pairs, two at the upper end and two at the lower end, although any number of such sockets may be employed. It is also understood that one of the uprights 3 is supported in advance of each of the front wheel guards.

The fender consists of a triangular frame comprising three side members 7, spaced apart and arranged one above the other and to which are secured a suitable number of upright members 8. These are all formed of spring metal, and the rear or base horizontal members 7 of the frame are slightly curved, as shown in Fig. 2. Fitting within the triangular frame thus formed are three smaller triangular frames 9, placed one above the other, and connected to the rear horizontal members 7. No upright members are connected to these interior triangular frames but there are arranged between said frames 9 and the side members 7 a plurality of spring rings 10, and within said members of spring rings 11, two of which are arranged spring rings 11, two of which are connected respectively to the members 7 and the frames 9. The other ring 11 of each member 9 is arranged in the apex portions of said members and is connected thereto and to the other two rings.

Preferably I make the rings in the apices of the various triangles larger than the other rings, as is also indicated in the drawings.

The fender so described is provided at its rear with suitable hooks 12 adapted to be inserted into the sockets 6, and by providing more sockets than hooks, I allow for vertical adjustment of the fender, thereby adapting it for use with higher or lower wheel guards as well as for use upon smooth pavements or uneven roads.

The sides of the fender are preferably covered by a suitable fabric 13. To further brace the fender, wire stays 14 are run across the top from the rear to the side members. The top of the fender may also be covered, if desired, and in case the position of the fender with respect to the head-lights may require it, suitable openings may of course be cut in the fabric 13, and there can also be cut air openings in the case of a thick fabric, so that the fender will not interfere with the cooling of the engines. These, however, are immaterial details, as many minor changes of this kind can be made without departing from the spirit of my invention.

What I claim is:

1. A fender consisting of a plurality of triangular frames spaced apart, one above the other, uprights connecting said frames, interior triangular frames arranged within those first mentioned and spring rings inserted between said triangular frames, said rings having their diameters in the plane of the frame, the said frames being constructed of a spring material.

2. A fender consisting of a plurality of triangular frames arranged one above the other and spaced apart, uprights connecting said triangular frames, horizontally arranged interior triangular frames carried by the rear members of the first mentioned triangular frames, spring rings placed within said second mentioned triangular members, and spring rings placed between the first and second triangular members, said rings being also arranged in horizontal planes.

3. A fender of the kind described comprising horizontally arranged triangular members spaced apart, uprights connecting said members, means for detachably securing the said fender to the wheel guards of an automobile, spring rings carried by said horizontal members, and a suitable fabric inclosing the sides of the said fender.

MAHLON WARNER.

Witnesses:
ZEB GASKILL,
GEO. W. BRANIN.